April 6, 1926.
J. F. NACHOD
1,579,729
PLASTIC FLOOR COVERING
Filed Sept. 20, 1923
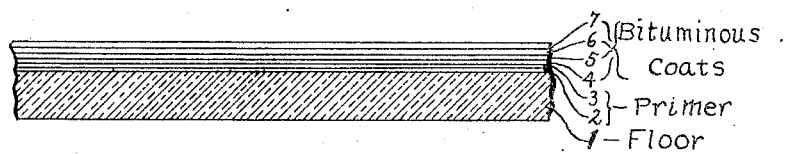
Inventor
Joseph F. Nachod
By John W. Harley
Attorney Patented Apr. 6, 1926.

1,579,729

UNITED STATES PATENT OFFICE.

JOSEPH F. NACHOD, OF BALTIMORE, MARYLAND, ASSIGNOR TO THE DURAFLEX COMPANY, OF BALTIMORE, MARYLAND, A CORPORATION OF MARYLAND.

PLASTIC FLOOR COVERING.

Application filed September 20, 1923. Serial No. 663,809.

*To all whom it may concern:*

Be it known that I, JOSEPH F. NACHOD, a citizen of the United States, residing at Baltimore, in the State of Maryland, have invented certain new and useful Improvements in Plastic Floor Coverings; and I do hereby declare the following to be a full, clear, and exact description of the invention, such as will enable others skilled in the art to which it appertains to make and use the same.

My invention relates to plastic floor coverings.

Among the objects of my invention are:—

To produce a plastic floor covering which is applied in a plurality of coats each having certain characteristics so that permanent unions are secured between the floor and the next adjacent coat and between succeeding coats of the covering.

To devise a process for applying a plastic covering comprising a plurality of coats to floors so that permanent unions are secured between the floor and the next adjacent coat and between succeeding coats of the coverings.

My improved floor covering is composed of a plurality of coats and some of the coats have qualities differing from those of the others, but all have the quality of forming firm and lasting unions with adjacent coats and the first priming coat forms a similar union with the floor.

In the drawing, which shows a section of a floor covering applied according to my invention:—

1 represents the floor, which may be formed of any material; 2 and 3 represent the priming coats, which may be formed of a solution of any suitable material, one of the requisites being that the coat 2 will form a firm and lasting union with the floor, and that the coat 3 will form a similar union with the coat 2.

I have found that a solution of bitumen in any of its solvents and having a consistency rendering it suitable of application in even coats by either a brush or spray is suitable for priming the floor 1.

After the priming coats 2 and 3 are put upon the floor 1, I apply the coats 4 and 5. The coats 4 and 5 may be composed of various substances, one of the requisites being that the coat 4 will form a firm and lasting union with the coat 3 and that the coat 5 will form a similar union with the coat 4.

I have found that the coats 4 and 5 may be made of a solution of bitumen in any of its solvents, the solution being of a thicker consistency than that suitable for the coats 2 and 3. It is also advisable to mix with the solution for the coats 4 and 5 either fibrous, granular or amorphous materials or any combinations of these materials in order to stiffen the coats 4 and 5.

After the coats 4 and 5 are put in place, I apply the coats 6 and 7. The coats 6 and 7 may be composed of various substances, one of the requisites being that the coat 6 will form a firm and lasting union with the coat 5 and that the coat 7 will form a similar union with the coat 6.

I have found that the coats 6 and 7 may be made as above specified for the coats 4 and 5, excepting that any suitable coloring matter may be mixed with the other ingredients in order that the surface coat may have the color desired.

I have found that mineral colors are suitable for this class of work.

From the foregoing, it is evident that my improved covering is composed of coats having three sets of characteristics, namely:—The coats 2 and 3 are composed of a substance or substances which give to the coat 2 the ability to unite firmly and lastingly with the floor 1 and to unite similarly with the coat 3. These coats are the natural color of the materials forming same.

The coats 4 and 5 are composed of a substance or substances which give to the coat 4 the ability to unite firmly and lastingly with the coat 3 and to unite similarly with the coat 5. These coats are the natural color of the materials forming same. These coats may also contain suitable stiffening or binding materials.

The coats 6 and 7 are composed of a substance or substances which give to the coat 6 the ability to unite firmly and lastingly with the coat 5 and to unite similarly with the coat 7. These coats are colored as desired and may also contain suitable stiffening or binding materials.

While I have shown two priming coats as applied to the floor 1, it is to be understood that for certain purposes the priming coat 3 may be omitted and the coat 4 applied directly to the coat 2.

It is also to be understood that if special coloring is not desired for the floor covering, the coats 6 and 7 may be omitted. The surface will then be the natural color of the coating 5.

It is to be understood that one priming coat 2 may be applied to the floor 1 and then a coat similar to the coat 4 applied to the coat 2. This would produce a surface of the natural color of the coat 4, or a coating similar to 6 may be placed upon the coat 4 if coloring is desired.

Hence, it is evident that I may use either a single priming coat and a single coat of uncolored plastic material, or a single coat of priming material, a single coat of uncolored plastic material and a single coat of colored plastic material; or I may use a plurality of each of said coats.

In carrying out my improved process, I first apply the priming coat 2 to the floor 1 and allow same to dry and I then apply the other coats, allowing each one to dry before the succeeding coat is applied.

While I have set forth one set of combinations suitable for my improved floor coverings and one process for applying the same, it is to be understood that the disclosure is for purposes of illustration only and in no-wise to limit the scope of my invention, for many changes may be made in the combinations of the various coatings and in the process for applying same without departing from the spirit of my invention.

I claim:—

1. The herein described process of coating floors which consist in applying a priming coat thereto composed of a thin solution of bitumen, in permitting this coat to dry and then applying a coat formed of a thick solution of bitumen.

2. The herein described process of coating floors which consists in applying thereto a priming coat composed of a thin solution of bitumen, in permitting said coat to dry and then applying a coat composed of a thick solution of bitumen containing stiffening material.

3. The herein described process of coating floors which consists in applying thereto a priming coat composed of a thin solution of a solid material, in permitting said coat to dry, then applying a coat composed of a thick solution of a solid material, permitting said second-named coat to dry and then applying a coat composed of a thick solution of solid material containing a coloring substance.

4. The herein described process of coating floors which consists in applying thereto a priming coat composed of a thin solution of a solid material, permitting said coat to dry, then applying a coat composed of a thick solution of a solid material, permitting said second-named coat to dry and then applying a coat composed of a thick solution of solid material containing a coloring substance and a stiffening material.

5. The herein described process of coating floors which consists in applying thereto a priming coat composed of a thin solution of a solid material, permitting said coat to dry, then applying a coat composed of a thick solution of a solid material, permitting said second-named coat to dry, and then applying a coat formed of a thick solution of solid material containing a coloring substance, both of said thick solutions containing stiffening materials.

6. The herein described process of coating floors which consists in applying thereto a priming coat composed of a thin solution of bitumen, in permitting said coat to dry, then applying a coat composed of a thick solution of bitumen, permitting said second-named coat to dry and then applying a coat composed of a thick solution of bitumen containing a coloring substance.

7. The herein described process of coating floors which consists in applying thereto a priming coat composed of a thin solution of bitumen, permitting said coat to dry, then applying a coat composed of a thick solution of bitumen, permitting said second-named coat to dry and then applying a coat composed of a thick solution of bitumen containing a coloring substance and a stiffening material.

8. The herein described process of coating floors which consists in applying thereto a priming coat composed of a thin solution of bitumen, permitting said coat to dry, then applying a coat composed of a thick solution of bitumen, permitting said second-named coat to dry, and then applying a coat formed of a thick solution of bitumen containing a coloring substance, both of said thick solutions containing stiffening materials.

9. A floor structure consisting of a supporting base with layers of bitumen superimposed thereon, the last of said layers containing a coloring substance and a stiffening material.

In testimony whereof, I affix my signature.

JOSEPH F. NACHOD.